| | |
|---|---|
| [72] Inventor | Eugene V. Abarotin<br>Franklin Township, Westmoreland County, Pa. |
| [21] Appl. No. | 802,553 |
| [22] Filed | Feb. 26, 1969 |
| [45] Patented | July 20, 1971 |
| [73] Assignee | United States Steel Corporation |

[54] APPARATUS FOR DETERMINING A DIMENSION OF A MEMBER
10 Claims, 8 Drawing Figs.

[52] U.S. Cl. ........................................................ 33/174 PA,
33/174 L, 33/143 L, 33/172 E, 33/147 N
[51] Int. Cl. .......................................................... G01b 7/28
[50] Field of Search.......................................... 33/174 L,
174 P, 174 PA, 174, 143 L, 147 L, 172 E, 147 M;
209/88; 340/259

[56] References Cited
UNITED STATES PATENTS

| | | | |
|---|---|---|---|
| 1,688,330 | 10/1928 | Gunther et al. ............... | 33/172 |
| 2,858,615 | 11/1958 | Aller ............................. | 33/174 |
| 3,226,833 | 1/1966 | Lemelson ..................... | 33/143 |
| 3,471,933 | 10/1969 | Jensen et al. ................. | 33/147 |

FOREIGN PATENTS

| 948,484 | 2/1964 | Great Britain................ | 33/174 |
|---|---|---|---|

*Primary Examiner*—Leonard Forman
*Assistant Examiner*—Gary G. Kuehl
*Attorney*—R. J. Leek, Jr.

ABSTRACT: An apparatus for determining a dimension of a member and having a frame, a sensing means on the frame adjacent the member and the sensing means having opposed sensing assemblies aligned adjacent the dimension is disclosed. Each of the sensing assemblies has a housing, a probe reciprocable in the housing and with respect to the member, retraction means associated with the probe and operable to retract the probe to an initial starting position, biasing means connected to the probe for moving the probe from the initial starting position to a measuring position into engagement with the member, and a first signal means associated with the probe and operable to produce a first output signal when the probe is in the measuring position. Indicating means are connected to the sensing assemblies and are adapted to receive the first output signals from the sensing assemblies and to indicate the dimension.

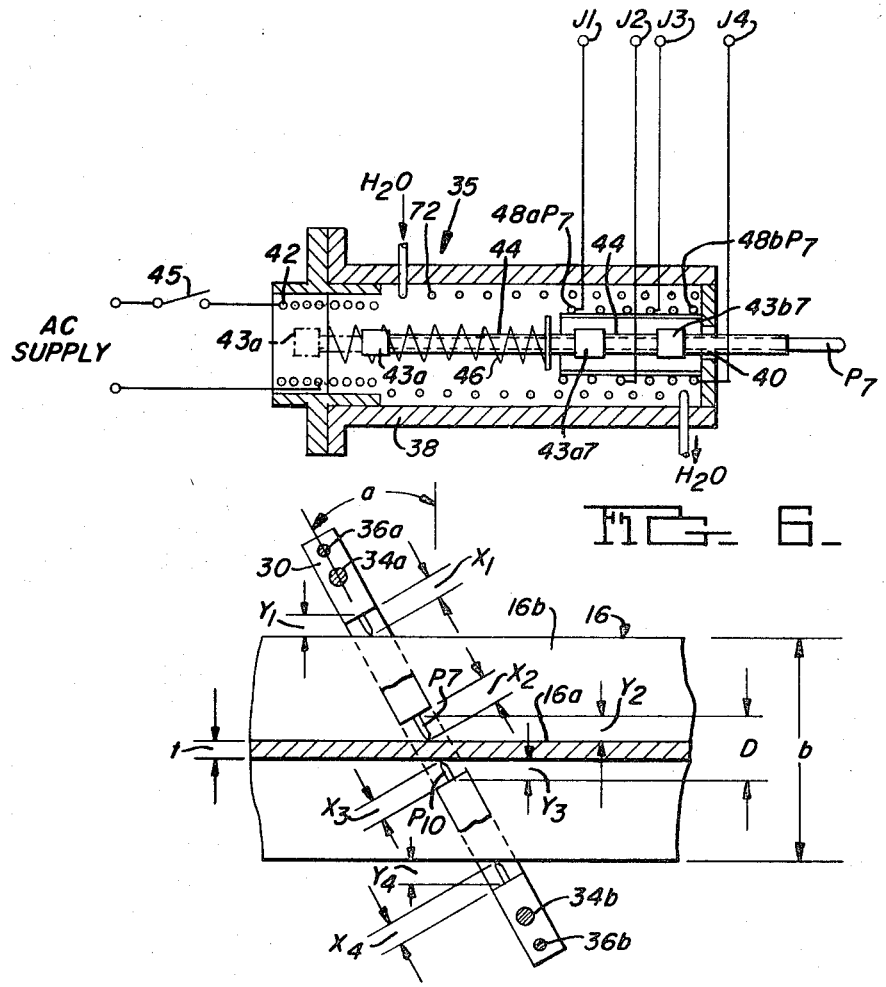
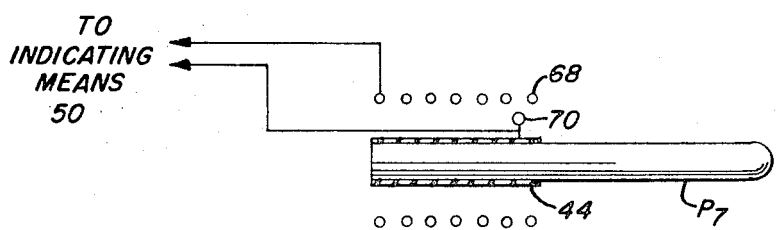

PATENTED JUL 20 1971 3,593,427

INVENTOR
EUGENE V. ABAROTIN
By
Attorney 3,593,427

APPARATUS FOR DETERMINING A DIMENSION OF A MEMBER

BACKGROUND OF THE INVENTION

Heretofore, a member, such as for example a wide flanged beam being formed in a rolling mill, was tested for dimensional accuracy and symmetry of its flanges and webs with respect to a vertical or horizontal axis after such beam had been rolled. It was customary practice for a sample piece, about 1 foot long, to be cut from the beam while the beam was near the rolling temperature (about 1,600° F.), which sample piece was then allowed to cool and upon reaching ambient or room temperature was checked manually for dimensional deviation and symmetry deviation. The cooling and checking period was time consuming and occurred when the original beam had reached a distant point from the sampling point.

Conventional apparatus of this type is shown in the following U.S. Patents:

| Patent No. | Inventor | Issued |
| --- | --- | --- |
| U.S. 1,814,354 | Webster et al. | 7-14-31 |
| U.S. 1,969,536 | Winne | 8-7-34 |
| U.S. 1,977,619 | Boyer et al. | 10-23-34 |
| U.S. 2,592,157 | Kendall | 4-8-52 |
| U.S. 2,692,045 | Stalhandske et al. | 10-19-54 |
| U.S. 2,748,937 | Casler et al. | 6-5-56 |
| U.S. 3,032,192 | Uhlig | 5-1-62 |
| U.S. 3,080,659 | Wolford | 3-12-63 |
| U.S. 3,088,591 | Perthen et al. | 5-7-63 |
| U.S. 3,140,545 | Murtland | 7-14-64 |
| U.S. 3,172,311 | Kendall | 3-9-65 |
| U.S. 3,218,066 | Halberschmidt et al. | 11-16-65 |
| U.S. 3,247,964 | Doud et al. | 4-26-66 |
| U.S. 3,278,023 | Schneider | 10-11-66 |
| British Patent No. 879,277 | Square D Co. | 10-11-61 |

OBJECTS OF THE INVENTION

It is the general object of this invention to avoid and overcome the foregoing and other difficulties of and objections to prior art practices by the provision of apparatus for measuring a dimension of a member, which apparatus:

a. tests the dimensional accuracy and symmetry deviation of the member automatically, b. determines the required dimensional characteristics of the member while such member is at operating temperature and at a test point on the manufacturing line in which the member is being processed, c. eliminates the cutting of a sample from the member and the associated cooling period for cooling the sample to room temperature, d. permits the conversion of the test results at operating temperature to room temperature by direct calibration or calibration from a chart or the like, e. is operable to handle a wide range of members and to cover a wide variety of test positions on the member for one fixed position of the apparatus, and f. is operable to determine tilt, waviness and symmetry of the member.

BRIEF SUMMARY OF THE INVENTION

The aforesaid objects of this invention, and other objects which will become apparent as the description proceeds, are achieved by providing apparatus for determining a dimension of a member. The apparatus has a frame, a sensing means in the frame adjacent the member and each sensing means has opposed sensing assemblies aligned adjacent the dimension. Each of the sensing assemblies has a housing, a probe reciprocable in the housing and with respect to the member, retraction means associated with the probe and operable to retract the probe to an initial starting position, biasing means connected to the probe for moving the probe from the initial starting position to a measuring position into engagement with the member, and a first signal means associated with the probe and operable to produce a first output signal when the probe is in the measuring position. Indicating means are connected to the sensing assemblies and adapted to receive the first output signals from the sensing assemblies and to indicate the dimension.

BRIEF DESCRIPTION OF THE SEVERAL VIEWS OF THE DRAWINGS

For a better understanding of this invention, reference should be had to the accompanying drawings, wherein like numerals of reference indicate similar parts throughout the several views and wherein:

FIG. 2 is a side view partially in section of a sensing assembly of the apparatus;

FIG. 6 is a fragmentary side elevational view, partially in section, and illustrating a dimensional-measuring and symmetry-deviation operation; and FIG. 7 is a schematic side view of an alternative embodiment of the sensing means.

Although the principles of this invention are broadly applicable to apparatus for determining a dimension of a fabricated member, this invention is particularly adapted for use in conjunction with apparatus for determining a dimension of a structural member, such as a beam, and hence it has been so illustrated and will be so described.

DETAILED DESCRIPTION

Figure 1:
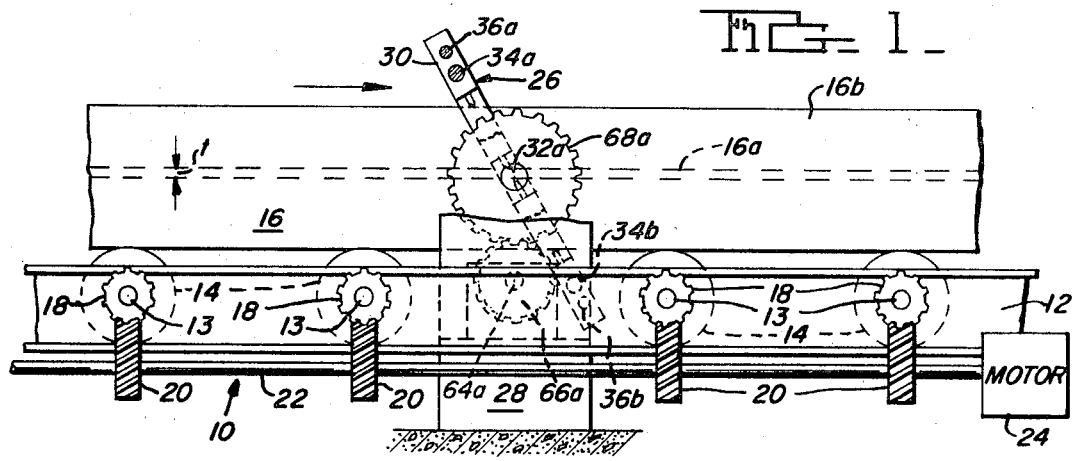
FIG. 1 is a fragmentary side elevational view of a rolling mill conveyor carrying a member, such as a rolled beam, and of the apparatus of this invention for determining a dimension of the beam.

With specific reference to the form of this invention illustrated in the drawings, and referring particularly to FIG. 1, a portion of a rolling mill conveyor is indicated generally by the reference numeral 10.

Figure 3:
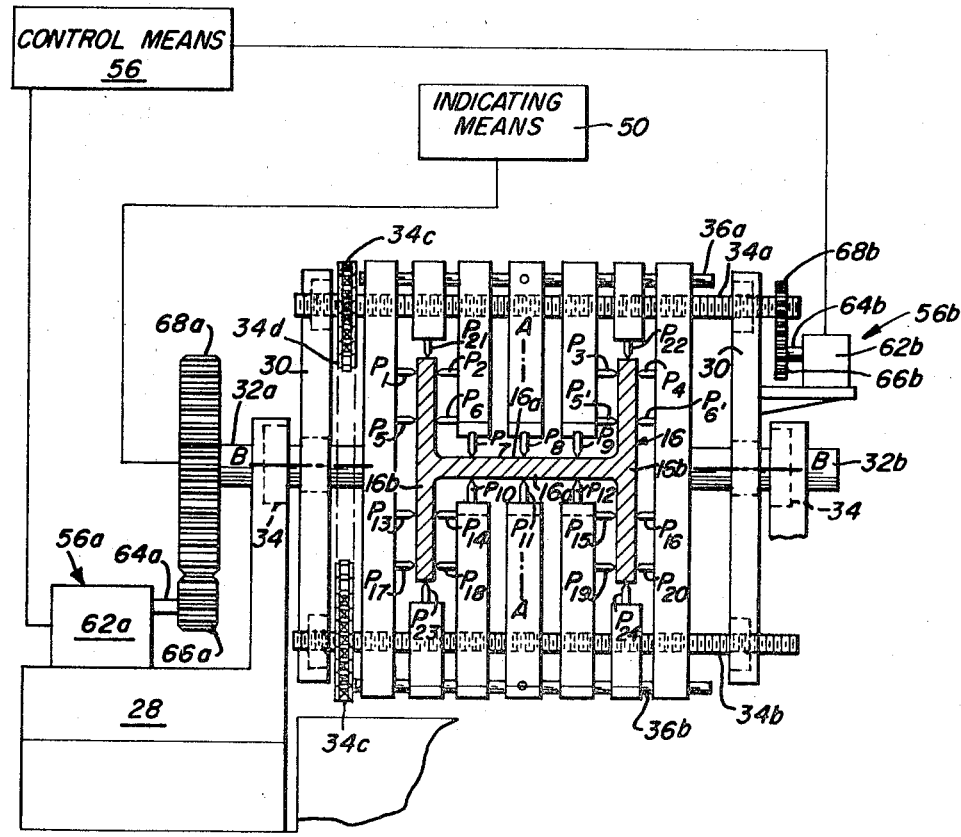
FIG. 3 is an end elevational view of the apparatus schematically showing the first drive means, the second drive means, the recorder and the control means.

This conveyor 10 (FIG. 1) has a frame 12 into which frame 12 are journaled a plurality of shafts 13 carrying rollers 14 for supporting and transporting a member, such as a beam 16. For the purpose of driving the rollers 14, gears 18 (FIG. 1) on the shafts 13 are driven by gears 20 on a shaft 22, which shaft 22 is driven by a motor 24. Disposed adjacent the beam 16 is the apparatus 26 (FIG. 1) of the present invention for determining a dimension, such as the dimension $t$ (i.e. the web thickness, FIGS. 1,6) of the beam 16 and mounted on a foundation 28 (FIGS. 1,3).

Apparatus 26

This apparatus 26 has a frame 30 (FIGS. 1,3,6) mounted on rotation stub shafts 32a, 32b (FIG. 3), which shafts 32a, 32b are journaled in bearings 34 (FIG. 3) in the foundation 28. A plurality of sensing means, such as the sensing assemblies 35 (FIG. 2) having probes $P_1P_2$—$P_{24}$ (FIG. 3) are mounted on the frame 30 by means of right- and left-threaded shafts 34a, 34b (FIGS. 1,3,6) threadable in the frame 30 and in the sensing assemblies 35. In order to integrate and align the sensing assemblies 35, guide means, such as the guides 36a, 36b (FIGS. 1,3,6) extend through the assemblies 35.

Sensing Assemblies 35

Each of the sensing assemblies 35 is similar to the one shown in FIG. 2 which has the probe $P_7$ and such sensing assemblies 35 are mounted, as above described and shown in FIG. 3, adjacent the beam 16. Opposed sensing assemblies 35 and their respective probes (i.e. $P_1,P_2$, etc.) are aligned adjacent the dimension to be measured. Each sensing assembly 35 has a cylindrical housing 38 (FIG. 2). A probe $P_7$ is reciprocable in a bearing 40 in the housing 38 and with respect to the beam 16. Retraction means, such as a coil 42 (FIG. 2) and a core 43a on the insulation 44 on the probe $P_7$ are operable to retract the probe $P_7$ to an initial starting or dotted line position shown in the left-hand position (FIG. 2). The coil 42 is connected through a normally open switch 45 to a voltage supply indicated by the legend "AC Supply." Energization of the coil 42 by closure of the switch 45 retracts the probe $P_7$ to the initial starting or dotted-line position shown in FIG. 2. Biasing means, such as a spring 46 (FIG. 2) extending from the housing 38 to the probe $P_7$ moves the probe $P_7$ from the initial starting position to a measuring or solid-line position (FIG. 2) into engagement with the beam 16 (FIG. 3).

For the purpose of producing a first output signal with respect to the measuring or solid-line position of the probe $P_7$ (FIGS. 2,3,6) a first signal means, such as a signal coil $48aP_7$ (FIGS. 2,5) and a core $43a_7$ on the insulation 44 on the probe $P_7$ is employed. The indicating means 50 (FIGS. 3,5) has a voltmeter 52a connected (through junctions J1,J2, FIG. 5) to the coil $48aP_7$ of the probe $P_7$ and the coil $48aP_{10}$ (FIG. 5) of the probe $P_{10}$ (in parallel) and to the AC supply so that the first output signals from the coils $48aP_7, 48aP_{10}$ (when the probes $P_7, P_{10}$ are in the measuring position with respect to the beam 16) are added together to produce a reading on the calibrated scale of the voltmeter 52a to indicate the thickness $t$ of the web 16a (FIGS. 1,3,5,6) of the beam 16.

In order to control the apparatus 26, a control means 56 (FIGS. 3,4,4A) is employed.

Control Means 56

This control means 56 (FIGS. 3,4,4A) has a first or rotary or rotational control means 56a (FIGS. 3,4) for rotating the frame 30 through an angle $a$ (FIG. 6) to accommodate the beam 16 under test in the apparatus 26 and a second or lateral control means 56b (FIG. 3) for positioning the frame 30 laterally with respect to the beam 16. When the frame 30 is in the vertical position (not shown) the apparatus 26 is operable to receive its largest size of member or beam 16. As the size of the beam 16 decreases, the frame 30 is rotated through the angle $a$ (FIG. 6) to accommodate such smaller sizes of the beam 16.

Figure 4A:
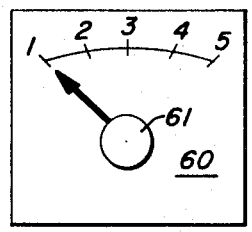
FIG. 4A is a front view of the transmitting portion of the control means showing the selector dial.
Figure 4:
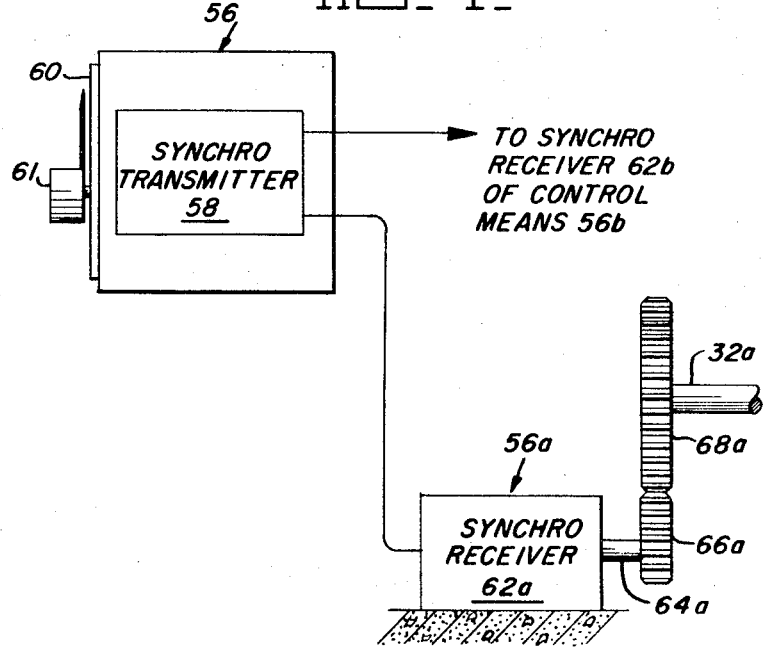
FIG. 4 is a fragmentary schematic end elevational view of the control means.

As shown in FIGS. 4,4A the rotational control means 56a is the by a synchrotransmitter 58 of the control means 56, a selsyn device of the type 359890 manufactured by General Electric Co., Schenectedy, New York, and shown in the Section 2522 of the General Electric Apparatus Handbook dated June 20, 1966. The transmitter 58 is provided with a pair of calibrated dials 60 (only one of which is shown) having thereon the sizes of beams 16 being tested and an associated knob 61. When one knob 61 is moved to the proper size of beam 16 position, a signal is transferred from the synchrotransmitter 58 to a synchroreceiver 62a (FIGS. 3,4) having a shaft 64a (FIGS. 1,4) carrying a gear 66a, which gear 66a drives a gear 68a on the shaft 32pa to rotate the frame 30 through the desired angle $a$ (FIG. 6).

Similarly, the lateral control means 56b has a synchroreceiver 62b (FIG. 3) which receives a signal from the synchrotransmitter 58 (after the proper setting of the other knob 61) and rotates the threaded shaft 34a the desired number of turns to laterally position the sensing assemblies 35 with respect to the beam 16 in the frame 30. The threaded shaft 34b is driven from the threaded shaft 34a by means of the sprockets 34c and chain 34d.

Alternative Embodiments

It will be understood by those skilled in the art that alternatively as shown in FIG. 7 the first signal means may be a variable resistor 68 and the probe $P_7$ may carry a slide wire 70.

Figure 5:
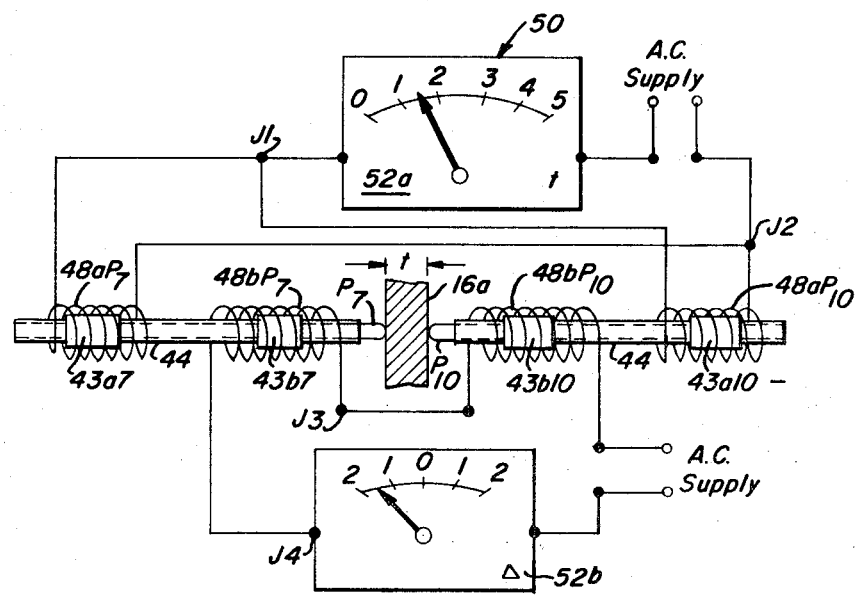
FIG. 5 is a schematic view of the indicating means.

Further, a shown in FIG. 5, a deviation $\Delta$ of the symmetry of the beam 16 is indicated by the indicating means 50 where a voltmeter 52b is connected through junctions J3,J4 (FIGS. 2,5) and the AC supply to the coils $48bP_7$ (FIGS. 2,5) and $48bP_{10}$ (FIG. 5) which coils $48bP_7$ and $48bP_{10}$ are in series. The associated cores $43b_7, 43b_{10}$ cooperate with the coils $48bP_7$, $48bP_{10}$ respectively.

Each sensing assembly 35 may be water cooled by a coil 72 (FIG. 2).

Sample Calculation

Referring to FIG. 6, $D=y_2+y_3+t$ and the variables $a, x_2, x_3$ are measured and the variables $x, y_2, y_3$ are calculated by the apparatus 26.

Since $t=D-(y_2+y_3)$ and $y_2=x_2 \cos a$ and $y_3=x_3 \cos a$ then $t=D-(x_2+x_3) \cos a$.

When the web 16a (FIGS. 1,3,5,6) is not symmetrical with respect to the top and bottom of the flanges 16b (FIGS 1,3,6) then $y_2 \neq y_3$ or $\Delta=y_2-y_3 \neq 0$ is a measure of the deviation $\Delta$ of the web 16a and can be measured on the calibrated voltmeter 52b (FIG. 5). Further, $\Delta=(x_2-x_3) \cos a$ where $x_2$ and $x_3$ are the output voltages of the voltmeter 52b calibrated to linear dimensions.

Other Characteristics

In addition to the web thickness $t$ and the deviation $\Delta$, tilt of the web 16a may be measured by comparison of probes $P_7-P_9$ or $P_{10}-P_{12}$ (FIG. 3), and the tilt of the flanges 16b by comparison of probes $P_{17}-P_{13}$, $P_1-P_5$, $P_{20}-P_{16}$ and $P_4-P_{6'}$ (FIG. 3).

Comparison of probes $P_1$, $P_5$, $P_{13}$, $P_{17}$ and $P_4$, $P_{6'}$, $P_{16}$, $P_{20}$ (FIG. 3) indicate the waviness of the flanges 16b and comparison of the probes $P_7$, $P_8$, $P_9$ and $P_{10}$, $P_{11}$, $P_{12}$ will indicate the waviness of the web 16a.

Further, by comparing the readings from probes $P_{21}$ and $P_{24}$ (FIG. 3) with those of probes $P_{23}$ and $P_{22}$, and by comparing the readings from probes $P_1$ and $P_{20}$ with those of $P_{17}$ and $P_4$ an indication of the displacement of the flanges 16b from the axis B-B and A-A (FIG. 3) may be obtained.

SUMMARY OF THE ACHIEVEMENTS OF THE OBJECTS OF THE INVENTION

It will be recognized by those skilled in the art that the objects of this invention have been achieved by providing an apparatus 26 for determining a dimension of a member 16, which apparatus 26 tests the dimensional accuracy of any dimension, such as $t$ of the member 16 and the symmetry deviation $\Delta$ of the member 16 automatically, accomplishes this at the operating temperature (about 1,400° F.) of the member 16 and at a test point on the conveyor 10, eliminates the cutting of a sample from the member 16 and the cooling of the member 16 to room temperature before measurement of the member 16, permits the conversion of the high-temperature measurements on the member 16 to room temperature measurements by calibration, is operable to handle a wide range of sizes of members 16 and covers a wide range of test areas on the member 16 while in a fixed position with respect to the conveyor 10, and is operable to test tilt, waviness and symmetry of the member 16.

While in accordance with the patent statutes a preferred and alternative embodiments of this invention have been illustrated and described in detail, it is to be particularly understood that the invention is not limited thereto or thereby.

I claim:

1. Apparatus for determining a dimension of a member, said apparatus having:
   a. a frame,
   b. a sensing means on said frame adjacent said member and having opposed sensing assemblies aligned with said dimension,
      1. each of said sensing assemblies having:
         a. a housing,
         b. a probe reciprocable in said housing and with respect to said member, c. retraction means associated with said probe and operable to retract said probe to an initial starting position, d. biasing means connected to said probe for moving said probe from said initial starting position to a measuring position, into engagement with said member, e. a first signal means associated with said probe and operable to produce a first output signal when said probe is in said measuring position, c. indicating means connected to said sensing assemblies and adapted to receive said first output signals from said sensing assemblies and to indicate said dimension, and d. said frame being pivotable, and having rotary drive means connected to said frame, and rotary control means connected to said rotary drive means for pivoting said apparatus into position for measuring said member.

2. The apparatus recited in claim 1 wherein said control means has a transmitter means, calibration means connected to said transmitter means for positioning said transmitter means and receiver means connected to said transmitter means for receiving a transmitted signal from said transmitter means and connected to said rotary drive means for causing said rotary drive means to pivot said frame.

3. The apparatus recited in claim 1 wherein said probe is electrically insulated from said sensing assembly.

4. The apparatus recited in claim 1 wherein said retraction means is a first coil adjacent said probe and a first core on said probe.

5. The apparatus recited in claim 1 wherein said first signal means is a second coil adjacent said probe and a second core on said probe.

6. The apparatus recited in claim 1 wherein said first signal means is a variable resistor adjacent said probe and said probe carries a slide wire thereon.

7. The apparatus recited in claim 1 wherein each of said sensing assemblies has a second signal means associated with said probe and operable to produce a second output signal when said probe is in said measuring position, said indicating means being connected to said second signal means for receiving said second output signal and for indicating a deviation from a standard.

8. The apparatus recited in claim 1 and having guide means associated with said sensing assemblies to align and integrate said sensing assemblies.

9. The apparatus recited in claim 1 and having lateral positioning means associated with said sensing assemblies and said control means has lateral control means for laterally positioning said sensing assemblies with respect to said member.

10. Apparatus for determining a dimension of a member, said apparatus having:

a. a frame, b. a sensing assembly on said frame aligned with said dimension,
  1. said sensing assembly having:
    a. a housing,
    b. a probe reciprocable in said housing and with respect to said member,
    c. retraction means associated with said probe and operable to retract said probe to an initial starting position,
    d. biasing means connected to said probe for moving said probe from said initial starting position to a measuring position into engagement with said member,
    e. a first signal means associated with said probe and operable to produce a first output signal when said probe is in said measuring position, c. indicating means connected to said sensing assembly and adapted to receive said first output signal from said sensing assembly and to indicate said dimension, and d. said frame being pivotable, and having rotary drive means connected to said frame, and rotary control means connected to said rotary drive means for pivoting said apparatus into position for measuring said member.

UNITED STATES PATENT OFFICE
CERTIFICATE OF CORRECTION

Patent No. 3,593,427    Dated July 20, 1971

Inventor(s) Eugene V. Abarotin

It is certified that error appears in the above-identified patent and that said Letters Patent are hereby corrected as shown below:

Column 3, line 47, "the", first occurrence, should read -- operated --; line 58, "32pa" should read -- 32a --. Column 4, line 14, "$y_2-x_2$" should read -- $y_2=x_2$ --.

Signed and sealed this 30th day of May 1972.

(SEAL)
Attest:

EDWARD M. FLETCHER, JR.          ROBERT GOTTSCHALK
Attesting Officer                Commissioner of Patents